(12) United States Patent
Djelassi et al.

(10) Patent No.: US 9,046,040 B2
(45) Date of Patent: Jun. 2, 2015

(54) DETECTION OF THE INGRESS OF WATER OR HAIL INTO A TURBINE ENGINE

(75) Inventors: Cedrik Djelassi, Marolles En Hurepoix (FR); Alexandra Riou, Chilly Mazarin (FR)

(73) Assignee: SNECMA, Paris (FR)

( * ) Notice: Subject to any disclaimer, the term of this patent is extended or adjusted under 35 U.S.C. 154(b) by 154 days.

(21) Appl. No.: 13/818,729

(22) PCT Filed: Aug. 22, 2011

(86) PCT No.: PCT/FR2011/051939
§ 371 (c)(1),
(2), (4) Date: Feb. 25, 2013

(87) PCT Pub. No.: WO2012/028804
PCT Pub. Date: Mar. 8, 2012

(65) Prior Publication Data
US 2013/0158831 A1    Jun. 20, 2013

(30) Foreign Application Priority Data
Aug. 30, 2010   (FR) .................................... 10 56836

(51) Int. Cl.
*G06F 19/00* (2011.01)
*G06G 7/70* (2006.01)
*F02C 9/28* (2006.01)
*F02C 7/00* (2006.01)

(52) U.S. Cl.
CPC ............. *F02C 9/28* (2013.01); *F05D 2270/096* (2013.01); *F02C 7/00* (2013.01)

(58) Field of Classification Search
USPC ................................... 701/1, 3, 9, 10, 14, 100
See application file for complete search history.

(56) References Cited

U.S. PATENT DOCUMENTS

| | | | | |
|---|---|---|---|---|
| 5,265,414 | A | * | 11/1993 | Mouton ...................... 60/39.091 |
| 5,471,831 | A | * | 12/1995 | Rowe ............................... 60/773 |
| 6,634,165 | B2 | * | 10/2003 | Tomlinson et al. ............ 60/39.3 |
| 6,644,009 | B2 | * | 11/2003 | Myers, Jr. .................. 60/39.091 |
| 7,895,818 | B2 | * | 3/2011 | Snell et al. ................. 60/39.092 |
| 2003/0115883 | A1 | * | 6/2003 | Myers, Jr. ....................... 60/773 |
| 2008/0302081 | A1 | * | 12/2008 | Snell et al. ................. 60/39.093 |
| 2011/0079015 | A1 | * | 4/2011 | Geis et al. ....................... 60/779 |

(Continued)

FOREIGN PATENT DOCUMENTS

| | | |
|---|---|---|
| EP | 0 533 567 | 3/1993 |
| EP | 0 616 118 | 9/1994 |

(Continued)

OTHER PUBLICATIONS

International Search Report Issued Dec. 12, 2011 in PCT/FR11/51939 Filed Aug. 22, 2011.

*Primary Examiner* — Bhavesh V Amin
(74) *Attorney, Agent, or Firm* — Oblon, McClelland, Maier & Neustadt, L.L.P.

(57) ABSTRACT

A detection method for detecting ingestion of water or hail in a gas turbine engine, the engine including at least a compressor, a combustion chamber, and a turbine, the method including: estimating a value of a first indicator representative of water or hail being ingested; estimating a value of a second indicator representative of water or hail being ingested, the second indicator being different from the first indicator; and calculating a value of a global indicator by summing at least the first indicator and the second indicator.

11 Claims, 3 Drawing Sheets

(56) References Cited

U.S. PATENT DOCUMENTS

2013/0158831 A1* 6/2013 Djelassi et al. ............... 701/100
2013/0255221 A1* 10/2013 Gaully et al. ............. 60/39.091

FOREIGN PATENT DOCUMENTS

| FR | 2 531 490 | 2/1984 |
| GB | 2 447 238 | 9/2008 |

* cited by examiner

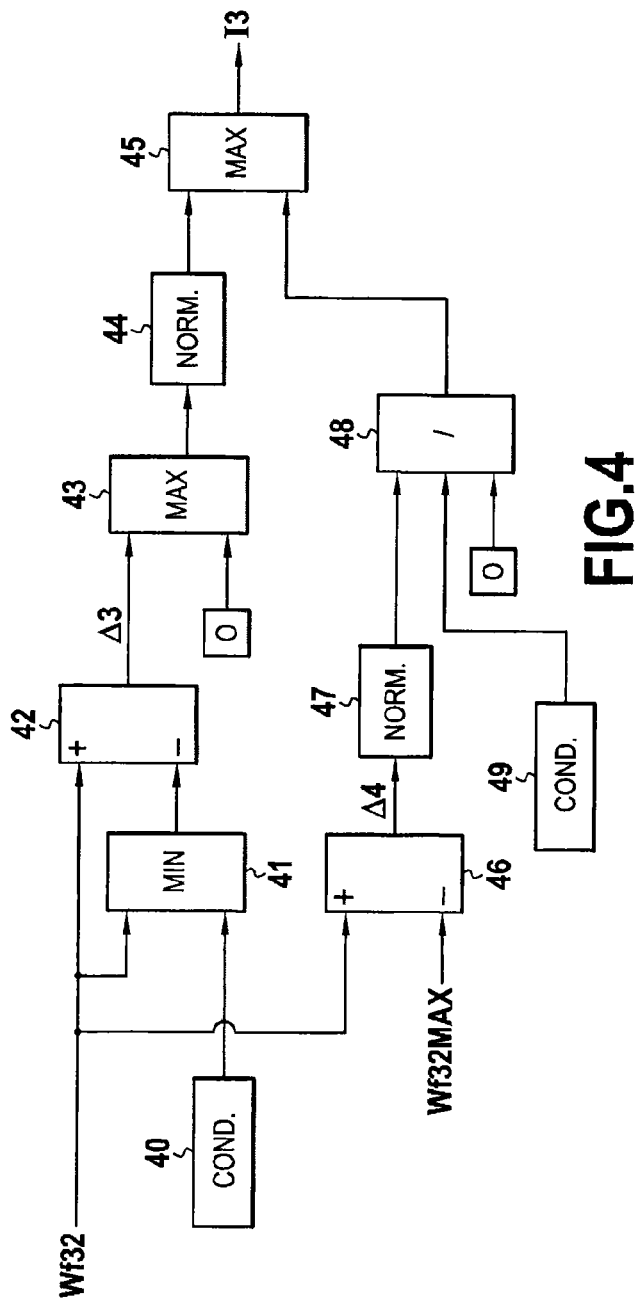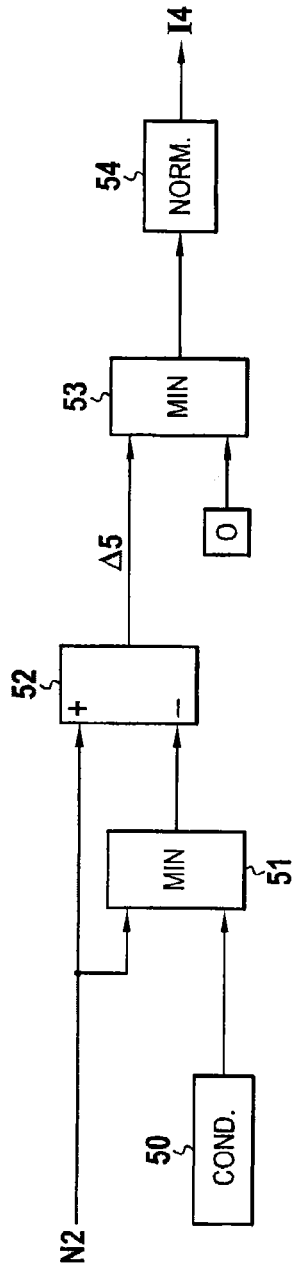
FIG.4
FIG.5

DETECTION OF THE INGRESS OF WATER OR HAIL INTO A TURBINE ENGINE

BACKGROUND OF THE INVENTION

The invention relates to the general field of aviation. In particular, the invention relates to detecting ingestion of water or hail by an aeroengine gas turbine.

An aeroengine gas turbine typically comprises a combustion chamber, with the combustion gases from the combustion chamber driving a high-pressure (HP) turbine and a low-pressure (LP) turbine. The HP turbine is coupled by a shaft to an HP compressor feeding the combustion chamber with compressed air, while the LP turbine is coupled by another shaft to a fan at the inlet of the engine.

The fan and the compressor absorb the air needed for proper operation of the engine, but depending on atmospheric conditions, they may also ingest water or hail, e.g. when the aircraft encounters a storm or passes through a cloud bank. The water and hail as absorbed in this way can disturb the operation of the engine.

When operating at full throttle, the compressor can generally raise the temperature of the air sufficiently for the water that is ingested to be vaporized and raised to a temperature that is high enough to avoid leading to flame-out of the combustion chamber. In contrast, if the engine is at idling speed, e.g. during a descent trajectory, on approach, when landing, the water can reach the combustion chamber leading to one or more burners flaming-out or even to the entire combustion chamber flaming-out and the engine stopping.

It is therefore desirable to detect the ingestion of water or hail and to adapt the operation of the engine accordingly.

For this purpose, document FR 2 681 377 proposes detecting the ingestion of water as a function of a difference between the temperature T2 of the air at the inlet to the compressor and T3 at the outlet from the compressor. Furthermore, such detection may be confirmed by estimating the efficiency of combustion.

A drawback of that solution is that it requires the characteristics of the engine to be determined empirically. Furthermore, depending on circumstances, it is possible that ingestion of water goes undetected. The calculated temperature difference is not suitable for detecting the ingestion of water under all circumstances.

Document U.S. Pat. No. 5,471,831 also proposes detecting the ingestion of water from the temperature of the air at the inlet and the outlet of the compressor, and from the pressure in the combustion chamber. In that document likewise, and depending on circumstances, it is possible for the ingestion of water to go undetected. Pressure variations in the combustion chamber are rather small to be able to draw clear conclusions therefrom.

There thus exists the need to detect ingestion of water or hail in a manner that is robust, effective, and fast.

OBJECT AND SUMMARY OF THE INVENTION

An object of the invention is to provide a method of detecting ingestion of water or hail that avoids at least some of the above-mentioned drawbacks. In particular, an object of the invention is to enable detection to be performed under a variety of circumstances.

To this end, the invention provides a detection method for detecting ingestion of water or hail in a gas turbine engine, said engine having at least a compressor, a combustion chamber, and a turbine, the method characterized in that it comprises:

a step of estimating the value of a first indicator representative of water or hail being ingested;

a step of estimating the value of a second indicator representative of water or hail being ingested, said second indicator being different from the first indicator; and a step of calculating the value of a global indicator by summing at least said first indicator and said second indicator.

In other words, the global indicator corresponds to the sum of at least two different indicators. Since the indicators are different, they can lead to conclusions that are different. Thus, depending on circumstances, when water or hail is ingested, three situations can be envisaged:

both indicators have a value indicative of ingestion;

the first indicator has a value indicative of ingestion and the second indicator has a value indicating there is no ingestion; and the first indicator has a value indicating there is no ingestion and the second indicator has a value indicative of ingestion.

Since the overall indicator corresponds to the sum of at least the first indicator and the second indicator, its value will be indicative of ingestion in all three of the above situations. Thus, the detection method of the invention makes it possible to detect the ingestion of water or hail under a variety of circumstances.

The detection method may further comprise:

a step of measuring the temperature T3 at the inlet of the combustion chamber; and a step of estimating a temperature T3M modeling the temperature T3;

wherein the value of the first indicator is estimated as a function of a difference between a drop in the temperature T3 and a drop in the temperature T3M, and the value of the second indicator is estimated as a function of a difference between the temperature T3 and the temperature T3M.

In an implementation, the value of the first indicator is estimated while taking account of a normalization function that minimizes the importance of small drops in the temperature T3.

The detection method may further comprise:

a step of measuring a speed of rotation N2 of the compressor and of the turbine;

wherein the value of the second indicator is estimated while taking account of a normalization function that depends on a variation in time of said speed of rotation N2.

The detection method may also comprise:

a step of filtering the measured temperature T3;

wherein the value of the second indicator is estimated as a function of the difference between the temperature T3 as filtered and the temperature T3M.

The detection method may likewise comprise:

a step of measuring a fuel flow rate Wf32; and a step of estimating the value of a third indicator representative of water or hail being ingested as a function at least of said fuel flow rate Wf32;

wherein the value of said global indicator is calculated by summing said first indicator, said second indicator, and said third indicator.

The detection method may further comprise:

a step of measuring a speed of rotation N2 of the compressor and of the turbine;

wherein the value of said third indicator is estimated as a function of a drop in the speed of rotation N2.

The invention also provides a method of controlling a gas turbine engine comprising at least a compressor, a combustion chamber, and a turbine, the method comprising:

a step of determining a fuel flow rate setpoint within a range limited by a top limit;

a step of detecting ingestion of water or hail performed in accordance with the above detection method; and in response to detecting the ingestion of water or hail, a step of determining a fuel flow rate setpoint in a range that exceeds said top limit.

The invention also provides a method of controlling a gas turbine engine comprising at least a compressor, a combustion chamber, and a turbine, the method comprising:

a step of detecting ingestion of water or hail performed in accordance with the detection method of the above invention; and in response to detecting the ingestion of water or hail that has led to flame-out, a step of selecting a re-ignition fuel flow rate higher than a nominal re-ignition fuel flow rate.

In a variant, the control method includes a step of determining an idling speed setpoint as a function of said overall indicator.

In corresponding manner, the invention provides a computer program comprising instructions for executing a detection method when the program is executed by a computer, and the invention also provides an electronic unit for controlling a gas turbine engine, said electronic unit having a memory containing a computer program of the invention. The invention also provides an aeroengine including a gas turbine engine and an electronic unit of the invention.

BRIEF DESCRIPTION OF THE DRAWINGS

The invention can better understood on reading the following description made by way of non-limiting indication and with reference to the accompanying drawings, in which:

FIGS. 2 to 5 are diagrams showing means for determining indicators that water or hail have been ingested.

DETAILED DESCRIPTION OF EMBODIMENTS

The invention is described below mainly in the context of its application to a gas turbine engine for propelling an airplane, e.g. of the kind shown in highly simplified manner in FIG. 1.

Nevertheless, the invention is applicable to other gas turbine engine, in particular to helicopter engines, to industrial gas turbines, or to auxiliary power units (APUs).

Figure 1:
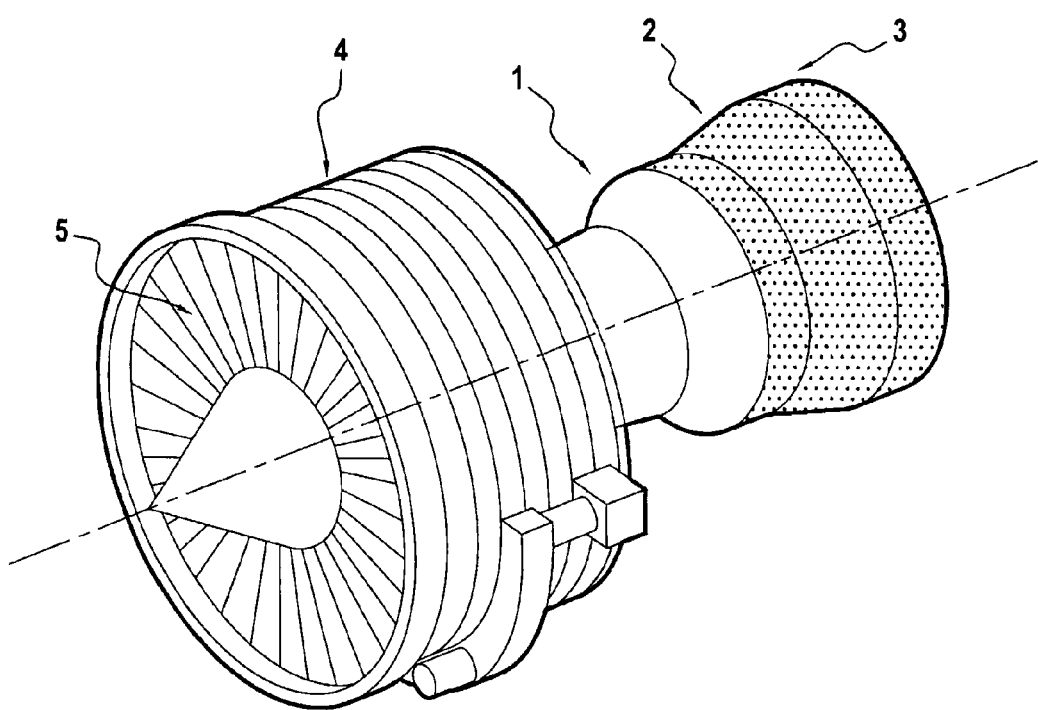
FIG. 1 is a simplified perspective view of a gas turbine engine suitable for implementing a method of detection in an implementation of the invention.

The engine shown in FIG. 1 includes a combustion chamber 1, with the combustion gas from the chamber 1 driving a high-pressure (HP) turbine 2 and a low-pressure (LP) turbine 3. The HP turbine 2 is coupled by a shaft to an HP compressor 4 feeding the combustion chamber 1 with air under pressure, and the LP turbine 3 is coupled by another shaft to a fan 5 at the inlet to the engine.

The operation of the engine is controlled by an electronic control unit that implements a main regulation loop for servo-controlling the speed of the engine to a setpoint speed that is a function of the desired thrust, by acting on the rate at which fuel is delivered to the combustion chamber 1. By way of example, the magnitude that is servo-controlled may be the speed of rotation N1 of the fan 5 and of the LP turbine 3, or it may be the engine pressure ratio (EPR).

To this end, the electronic control unit acquires signals representative of various measured operating parameters, and in particular:

the temperature T25 at the inlet to the HP compressor 4;

the temperature T3 at the inlet to the combustion chamber 1;

the fuel flow rate Wf32, e.g. measured on the basis of the position of a fuel metering unit; and the speed of rotation N2 of the HP turbine 2 and the HP compressor 4.

The electronic control unit can also estimate the values of certain parameters by using models. For example, the temperature T25 can be estimated by a model temperature T25M, and the temperature T3 can be estimated by a model temperature T3M. The models used for modeling the temperatures T25M and T3M are known to the person skilled in the art and there is no need to give a detailed description of them.

As explained above, ingesting water or hail can disturb the operation of the engine. Thus, the electronic control unit implements a method of detecting the ingestion of water or hail and adapts the operation of the engine when such ingestion is detected.

There follows a description of the method of detecting that water or hail has been ingested.

In order to detect ingestion, the electronic control unit calculates the value of a global indicator IG by summing three different indicators I1, I2, and I34:

$$IG=I1=I2+I34$$

When water or hail is ingested, the measured temperature T3 differs from the model temperature T3M. This difference is characterized by the value of the temperature T3M stagnating while the temperature T3 drops, e.g. by several tens of degrees. In order to observe this difference, the model temperature T3M may be derived from the temperature T25M instead of the temperature T25, in order to avoid any disturbance to the temperature T25 by ice.

Figure 2:
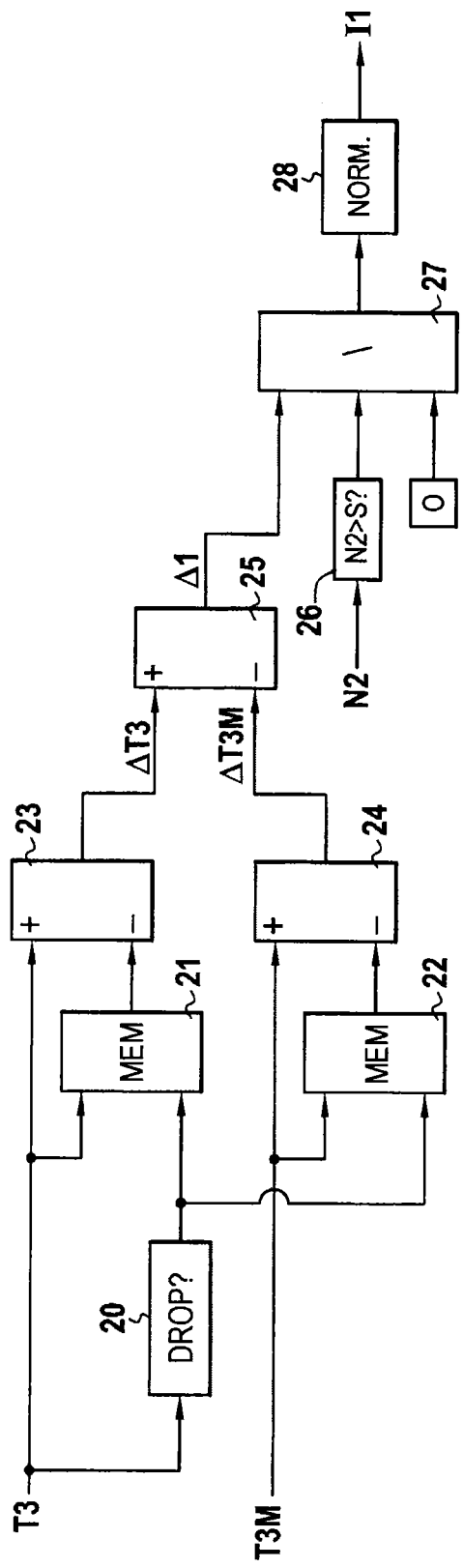

The indicator I1 seeks to characterize the dynamic difference between the temperature T3 and the temperature T3M. FIG. 2 is a diagram showing means for estimating the indicator I1, which means may be implemented for example in the form of a software module executed by the electronic control unit.

FIG. 2 shows a detector module 20 suitable for detecting a drop in the temperature T3. For example, the module 20 calculates the time derivative dT3/dt of the temperature T3, and when it detects a drop characterized by dT3/dt<0, it generates a storage signal for storage modules 21 and 22.

When the software modules 21 and 22 receive the storage signal from the detection module 20, they store the current values of the temperatures T3 and T3M, respectively.

Thus, the subtracter module 23 receives firstly the current value of the temperature T3 and secondly the value of the temperature T3 as stored by the storage module 21. The subtracter module 23 thus delivers a difference ΔT3 representing the size of the drop in the temperature T3 since detection by the detection module 20.

In corresponding manner, the subtracter module 24 receives firstly the current value of the temperature T3M and secondly the value of the temperature T3M as stored by the storage module 22. The subtracter module 24 thus delivers a difference ΔT3M representing the size of the drop in the temperature T3M since detection by the detection module 20.

The subtracter module 25 calculates the difference Δ1 between ΔT3 and ΔT3M.

A module 26 compares the speed of rotation N2 with a threshold S. It is known that the model temperature T3M is valid only above a sufficient speed of rotation N2.

If the speed of rotation N2 is below the threshold S, that means that the model temperature T3M is not valid. Thus, the module 26 sends a switch signal to the switch 27 in order to select the value 0. Otherwise, if the speed of rotation N2 is greater than the threshold S, that means that the model temperature T3M is valid. Thus, the module 26 sends a switch signal to the switch 27 in order to select the difference Δ1.

The difference Δ1 or the value 0 is thus forwarded by the switch 27 to the normalization module 28. The normalization module 28 delivers the value of the indicator I1.

By way of example, the normalization module 28 delivers a value lying in the range 0 to 1 by applying an increasing function F to the value received from the switch 27, taken as an absolute value. The function F may minimize the importance of small temperature drops in order to avoid false detection due to dynamic inaccuracy of the model.

Thus, if the speed of rotation N2 is not sufficient, the indicator I1 has the value 0. If the speed of rotation N2 is sufficient, the indicator I1 comes increasingly close to 1 with increasing size of the difference Δ1 (in absolute value). A high value for the indicator I1 thus indicates a large difference between the drop in the temperature T3 and the drop in the temperature T3M, which is characteristic of ingestion.

In other words, if the value of the indicator I1 is equal or close to 1, that indicates ingestion has taken place, whereas a value equal or close to 0 indicates no ingestion.

The indicator I1 makes it possible to detect ingestion in a manner that is very effective in the event of a change of state since it measures a relative difference between the drop in the temperature T3 and its theoretical value. It is therefore unaffected by the static error in the model temperature T3M but not by its dynamic error.

Figure 3:
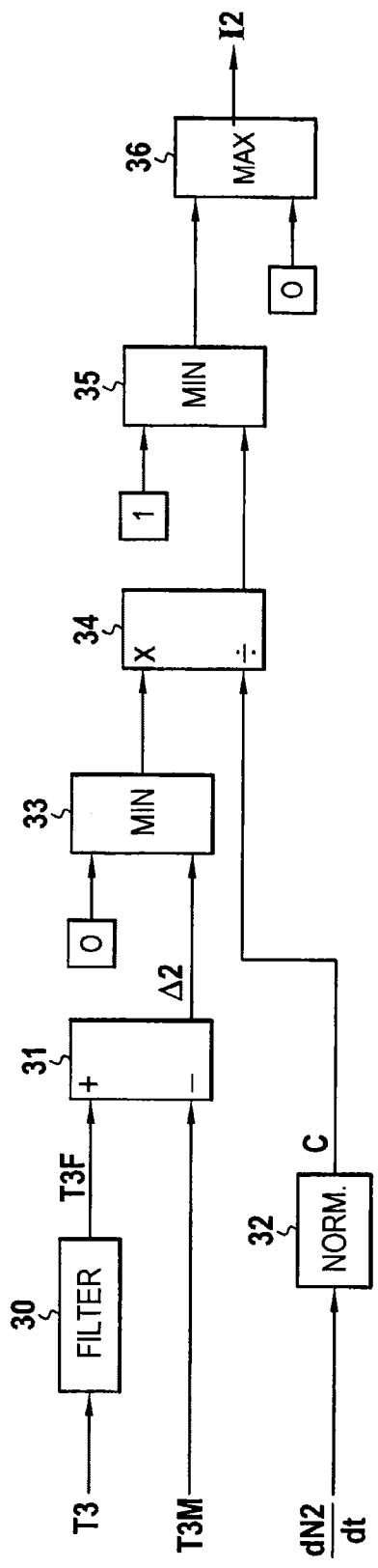

The indicator I2 seeks to characterize the absolute difference between the temperature T3 and the temperature T3M. FIG. 3 is a diagram showing means for estimating the indicator I2, which means may be implemented for example in the form of a software module executed by the electronic control unit.

The temperature T3 is filtered by a filter 30 that delivers a filtered temperature T3F. By way of example, the filter 30 is a first order lowpass filter serving to eliminate measurement noise in order to avoid false detections.

The subtracter 31 calculates the difference Δ2 between the temperature T3F and the temperature T3M. As explained above, in the event of ingestion, the temperature T3 drops, whereas the model temperature T3M stagnates. Thus, the module 33 provides the smaller of 0 and Δ2 so as to avoid taking account of situations in which T3 is greater than T3M.

The difference Δ2 is normalized by being divided in the divider 34 by a coefficient C representing a minimum ingestion temperature coefficient. The coefficient C is determined by a normalization module 32 that has as input the time derivative $dN2/dt$ of the speed of rotation N2. The accuracy of the model temperature T3M depends on variations in speed (a stabilized stage, an acceleration stage, a deceleration stage, . . . ). In particular, the model temperature is more accurate under stable conditions than during a transient. Thus, during a transient, the coefficient C is higher (in absolute value) so that the requirement for a difference between T3 and T3M for detecting ingestion is less constraining.

The modules 35 and 36 serve to limit the indicator I2 to the range 0 to 1.

Thus, if the temperature T3 is greater than the temperature T3M, the value of the indicator I2 is 0. If the temperature T3 is less than the temperature T3M, the value of the indicator I2 comes increasingly close to 1 with increasing difference Δ2 (in absolute value).

In other words, a value of the indicator I2 that is equal or close to 1 is indicative of ingestion, whereas a value that is equal or close to 0 indicates no ingestion.

The indicator I2 is complementary to the indicator I1, since it enables detections to be made without a change in state. This is particularly advantageous on starting or after reinitializing the electronic control unit, since the indicator I1 does not enable detection to be performed under such circumstances.

The indicator I34 is calculated as a function of an indicator I3 and of an indicator I4.

As explained above, the electronic control unit implements a main regulation loop for servo-controlling the speed of the engine to a setpoint speed, by acting on the rate at which fuel is fed to the combustion chamber 1. Thus, the electronic control unit determines a fuel flow rate setpoint within a range defined by a high limit, referred to as the C/P limit, for the purpose of protecting the engine against surging.

Ingesting water or hail tends to cause the speed of the engine to drop. Thus, in the event of ingestion, the electronic control unit will tend to increase the setpoint for the fuel flow rate. This increase may lead to operation at the C/P limit.

The indicator I3 seeks to characterize such an increase in the fuel flow rate or operation at the limit. FIG. 4 is a diagram showing means for estimating the indicator I3, which means may be implemented for example in the form of a software module executed by the electronic control unit.

FIG. 4 shows a module 40 for determining whether a condition exists for storing a value in memory. When the indicator I1 is greater than the predetermined threshold, and if the electronic control unit is not requesting any reduction of speed, then the module 40 sends a storage signal to a storage module 41. The storage module 41 then stores the current value Wf32 of the flow rate.

A subtracter 42 determines the difference Δ3 between the current flow rate value Wf32 and the flow rate stored by the module 41. The module 43 selects the greater of the difference Δ3 and the value 0 in order to take account only of increases in flow rate. The output for the module 43 is delivered to the normalization module 44 that serves to limit the influence of small variations in flow rate and to emphasize large variations. The output from the normalization module 44 thus represents increases in the flow rate Wf32 and it is delivered to the module 45.

The subtracter 46 determines the margin from the limit, i.e. the difference between the flow rate Wf32 and the maximum flow rate when operating at the C/P limit. The normalization module 47 serves to convert a small margin into a large output value and a large margin into a small output value. The output from the normalization module 47 is delivered to a selector 48 that supplies the module 45 either with the value delivered by the normalization module 48, or else the value 0, as a function of the detection signal delivered by the module 49 for determining whether a selection condition exists. The module 49 delivers a signal for selecting the value delivered by the normalization module 48 when the indicator I1 is greater than a predetermined threshold.

Thus, if the indicator I1 is small, the modules 40 and 49 do not trigger calculation of the indicator I3 so its value is 0.

However, if the indicator I1 is greater than the predetermined threshold, then the elements 40 to 44 determine a first signal representative of the increase in flow rate, and the elements 46 to 49 determine a second signal representative of the margin from the limit.

If the margin is large, then the flow rate increase is not limited. Thus, in the event of ingestion, the first signal has a high value and the second signal has a low value. In contrast, if the margin is small, then the increase in flow rate is limited. Thus, in the event of ingestion, the first signal has a small value and the second signal has a large value since it is inversely proportional to the margin.

The module 45 selects the greater of the above-mentioned first and second signals in order to deliver the indicator I3. Thus, in both of the above-mentioned situations, in the event of ingestion, the indicator I3 has a high value.

By way of example, the normalization modules 44 and 47 are designed to deliver a value lying in the range 0 to 1. Thus, a value of the indicator I3 that is equal to or close to 1 indicates an ingestion, whereas a value that is equal or close to 0 indicates there is no ingestion.

Furthermore, an ingestion may give rise to a drop or a stagnation in the speed of the engine. More precisely, if the regulation loop implemented by the electronic control unit seeks to keep the speed of rotation N2 constant, the speed of rotation N2 stagnates in the event of ingestion. However, when operating at the limit or if the regulated parameter is not the speed of rotation N2 (e.g. if the regulated parameter is the compression ratio of the engine), then ingestion can lead to a drop in the speed of rotation N2.

The indicator I4 thus seeks to characterize drops in the speed of rotation N2. FIG. 5 is a diagram of means for estimating the indicator I4, which means may for example be implemented in the form of a software module executed by the electronic control unit.

FIG. 5 shows a module 50 for determining whether a storage condition exists. When the indicator I1 is greater than a predetermined threshold, the module 50 sends a storage signal to the storage module 51. The storage module 51 then stores the current value of the speed of rotation N2.

The subtracter 52 determines the difference Δ5 between the current value of the speed of rotation N2 and the speed stored by the storage module 51. The module 53 then selects the smaller of the different Δ5 and the value 0 so as to take account only of reductions in speed. The output from the module 53 is delivered to the normalization module 54, which makes it possible to limit the influence of small drops of speed and to emphasize large drops of speed. The output from the normalization module 54 delivers the indicator I4.

By way of example, the normalization module 54 is designed to provide a value lying in the range 0 to 1. Thus, a value for the indicator I4 that is equal or close to 1 is indicative of an ingestion, whereas a value equal or close to 0 is indicative of no ingestion.

The indicator I34 is determined by performing a weighted sum of the indicators I3 and I4. The weighting serves to select the relative importance of the indicators I3 and I4 and can also serve to limit the value of the indicator I34 to the range 0 to 1.

As explained above, the global indicator IG is the sum of the indicators I1, I2, and I34. Furthermore, as explained above, a value close to 0 for any of the indicators I1, I2, and I34 indicates there is no ingestion and value close to 1 for any of the indicators I1, I2, and I34 indicates ingestion.

Thus, the global indicator IG has a value lying in the range 0 to 3, with a value close to 0 indicating there is no ingestion and a value close to 3 indicating there is ingestion.

If the global indicator IG is greater than a predetermined threshold $S_{ingest}$, then the electronic control unit concludes that water or hail has been ingested. The electronic control unit considers that ingestion continues so long as the value of the global indicator IG has not dropped back below a threshold $S_{ingest\_over}$, e.g. equal to half the threshold $S_{ingest}$.

As explained above, when ingestion is detected, the electronic control unit adapts the operation of the engine.

For example, in normal operation, the electronic control unit determines a fuel flow rate setpoint that lies in a range that is limited by an upper limit referred to as the C/P limit. When ingestion is detected, the electronic control unit may discard the limit and thus provide a fuel flow rate setpoint that is greater than the limit. This makes it possible to increase the richness of the mixture in the combustion chamber 1 and thus maintain the speed of the engine.

In normal operation, in the event of the combustion chamber flaming-out, the electronic control unit makes use of a predetermined re-ignition fuel flow rate setpoint. In the event of water ingestion leading to the engine flaming-out, a higher re-ignition fuel flow rate setpoint may be used. This makes it easier to achieve re-ignition.

When idling, the risk of water or hail ingestion leading to flame-out is increased. In prior art aircraft, a high idling speed is used for limiting this risk, with the consequence in particular of limiting the rate of sink. In an implementation of the invention, the electronic unit determines an idling setpoint that is slow as a function of the global indicator IG. More precisely, if the global indicator IG is zero or small, that means there is no ingestion and it is possible to use a low idling speed without any risk of the combustion chamber flaming-out. In contrast, if the global indicator IG is high, that indicates ingestion and a higher idling speed is set so as to avoid the combustion chamber flaming-out.

The description above relates to a global indicator that is determined by summing three indicators. Naturally, the invention covers calculating a global indicator by summing some arbitrary number of different indicators.

Each of the three above-described indicators has a value lying in the range 0 to 1. Naturally, in a variant, the indicators could have values lying in different ranges. This may serve, for example, to give one indicator more importance than another.

The invention claimed is:

1. A detection method for detecting ingestion of water or hail in a gas turbine engine, the engine including at least a compressor, a combustion chamber, and a turbine, the method comprising:
    estimating, using a processor, a value of a first indicator representative of water or hail being ingested;
    estimating, using the processor, a value of a second indicator representative of water or hail being ingested, the second indicator being different from the first indicator;
    calculating, using the processor, a value of a global indicator by summing at least the first indicator and the second indicator;
    measuring temperature at an inlet of the combustion chamber;
    estimating, using the processor, a temperature modeling the measured temperature; and
    filtering, using the processor, the measured temperature,
    wherein the value of the first indicator is estimated as a function of a difference between a drop in the measured temperature and a drop in the estimated temperature, and the value of the second indicator is estimated as a function of a difference between the measured temperature and the estimated temperature, and
    wherein the value of the second indicator is estimated as a function of the difference between the measured temperature as filtered and the estimated temperature.

2. A detection method according to claim 1, wherein the value of the first indicator is estimated while taking account of a normalization function that minimizes an importance of small drops in the measured temperature.

3. A detection method according to claim 1, further comprising:
measuring a speed of rotation of the compressor and of the turbine;
wherein the value of the second indicator is estimated while taking account of a normalization function that depends on a variation in time of the speed of rotation.

4. A detection method according to claim 1, further comprising:
measuring a fuel flow rate; and
estimating, using the processor, the value of a third indicator representative of water or hail being ingested as a function at least of the fuel flow rate;
wherein the value of the global indicator is calculated by summing the first indicator, the second indicator, and the third indicator.

5. A detection method according to claim 4, further comprising:
measuring a speed of rotation of the compressor and of the turbine;
wherein the value of the third indicator is estimated as a function of a drop in the speed of rotation.

6. A method of controlling a gas turbine engine including at least a compressor, a combustion chamber, and a turbine, the method comprising:
determining a fuel flow rate setpoint within a range limited by a top limit;
detecting ingestion of water or hail by
estimating, using a processor, a value of a first indicator representative of water or hail being ingested;
estimating, using the processor, a value of a second indicator representative of water or hail being ingested, the second indicator being different from the first indicator;
calculating, using the processor, a value of a global indicator by summing at least the first indicator and the second indicator;
measuring temperature at an inlet of the combustion chamber;
estimating, using the processor, a temperature modeling the measured temperature; and
filtering, using the processor, the measured temperature,
wherein the value of the first indicator is estimated as a function of a difference between a drop in the measured temperature and a drop in the estimated temperature, and the value of the second indicator is estimated as a function of a difference between the measured temperature and the estimated temperature, and
wherein the value of the second indicator is estimated as a function of the difference between the measured temperature as filtered and the estimated temperature; and
in response to detecting the ingestion of water or hail, determining a fuel flow rate setpoint in a range that exceeds the top limit.

7. A method of controlling a gas turbine engine including at least a compressor, a combustion chamber, and a turbine, the method comprising:
detecting ingestion of water or hail by
estimating, using a processor, a value of a first indicator representative of water or hail being ingested;
estimating, using the processor, a value of a second indicator representative of water or hail being ingested, the second indicator being different from the first indicator;
calculating, using the processor, a value of a global indicator by summing at least the first indicator and the second indicator;
measuring temperature at an inlet of the combustion chamber;
estimating, using the processor, a temperature modeling the measured temperature; and
filtering, using the processor, the measured temperature,
wherein the value of the first indicator is estimated as a function of a difference between a drop in the measured temperature and a drop in the estimated temperature, and the value of the second indicator is estimated as a function of a difference between the measured temperature and the estimated temperature, and
wherein the value of the second indicator is estimated as a function of the difference between the measured temperature as filtered and the estimated temperature; and
in response to detecting the ingestion of water or hail that has led to a flame-out, selecting a re-ignition fuel flow rate higher than a nominal re-ignition fuel flow rate.

8. A method of controlling a gas turbine engine including at least a compressor, a combustion chamber, and a turbine, the method comprising:
detecting ingestion of water or hail by
estimating, using a processor, a value of a first indicator representative of water or hail being ingested;
estimating, using the processor, a value of a second indicator representative of water or hail being ingested, the second indicator being different from the first indicator;
calculating, using the processor, a value of a global indicator by summing at least the first indicator and the second indicator;
measuring temperature at an inlet of the combustion chamber;
estimating, using the processor, a temperature modeling the measured temperature; and
filtering, using the processor, the measured temperature,
wherein the value of the first indicator is estimated as a function of a difference between a drop in the measured temperature and a drop in the estimated temperature, and the value of the second indicator is estimated as a function of a difference between the measured temperature and the estimated temperature, and
wherein the value of the second indicator is estimated as a function of the difference between the measured temperature as filtered and the estimated temperature; and
determining an idling speed setpoint as a function of the global indicator.

9. A non-transitory computer readable medium storing a program for detecting ingestion of water or hail in a gas turbine engine, the engine including at least a compressor, a combustion chamber, and a turbine, wherein the program, when executed, cause a computer to perform a method comprising:
estimating a value of a first indicator representative of water or hail being ingested;
estimating a value of a second indicator representative of water or hail being ingested, the second indicator being different from the first indicator;
calculating a value of a global indicator by summing at least the first indicator and the second indicator;
measuring temperature at an inlet of the combustion chamber;

estimating a temperature modeling the measured temperature; and filtering the measured temperature, wherein the value of the first indicator is estimated as a function of a difference between a drop in the measured temperature and a drop in the estimated temperature, and the value of the second indicator is estimated as a function of a difference between the measured temperature and the estimated temperature, and wherein the value of the second indicator is estimated as a function of the difference between the measured temperature as filtered and the estimated temperature.

10. An electronic unit for controlling a gas turbine engine, the electronic unit comprising a memory including the computer readable medium according to claim 9.

11. An aeroengine comprising a gas turbine engine and an electronic unit according to claim 10.

* * * * *